(12) United States Patent  
Sato et al.

(10) Patent No.: US 7,374,606 B2
(45) Date of Patent: May 20, 2008

(54) WATER-BASED INK AND INK RECORDING METHOD

(75) Inventors: Shinichi Sato, Kanagawa (JP); Takao Yamamoto, Kanagawa (JP); Kumiko Mafune, Kanagawa (JP); Sadayuki Sugama, Ibaraki (JP); Tsuyoshi Kanke, Kanagawa (JP); Yoshihide Aikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 520 days.

(21) Appl. No.: 10/873,156

(22) Filed: Jun. 23, 2004

(65) Prior Publication Data

US 2005/0005818 A1 Jan. 13, 2005

(30) Foreign Application Priority Data

Jun. 27, 2003 (JP) ............................. 2003-185201

(51) Int. Cl.
*C09D 11/02* (2006.01)
(52) U.S. Cl. ................... 106/31.27; 106/31.6
(58) Field of Classification Search ............. 106/31.27, 106/31.6
See application file for complete search history.

(56) References Cited

U.S. PATENT DOCUMENTS

| 4,202,870 | A | | 5/1980 | Weber et al. ............... 423/630 |
|---|---|---|---|---|
| 4,242,271 | A | | 12/1980 | Weber et al. ......... 260/488 AD |
| 4,248,852 | A | | 2/1981 | Wakabayashi et al. ...... 423/626 |
| 4,313,124 | A | | 1/1982 | Hara ....................... 346/140 R |
| 4,345,262 | A | | 8/1982 | Shirato et al. ........... 346/140 R |
| 4,463,359 | A | | 7/1984 | Ayata et al. ................. 346/1.1 |
| 4,723,129 | A | | 2/1988 | Endo et al. .................. 346/1.1 |
| 4,732,613 | A | | 3/1988 | Shioya et al. ................ 106/20 |
| 4,740,796 | A | | 4/1988 | Endo et al. .................. 346/1.1 |
| 5,354,369 | A | * | 10/1994 | Shimomura et al. ..... 106/31.43 |
| 5,482,545 | A | | 1/1996 | Aoki et al. ................ 106/22 K |
| 5,635,291 | A | | 6/1997 | Yoshino et al. .......... 428/304.4 |
| 5,637,140 | A | * | 6/1997 | Fujioka .................... 106/31.35 |
| 5,800,916 | A | | 9/1998 | Yoshino et al. ............. 428/328 |
| 5,846,647 | A | | 12/1998 | Yoshino et al. ............. 428/328 |
| 5,851,654 | A | | 12/1998 | Yoshino et al. ............. 428/328 |
| 5,869,177 | A | | 2/1999 | Yoshino et al. ............. 428/328 |
| 5,955,185 | A | | 9/1999 | Yoshino et al. .......... 428/304.4 |
| 5,962,124 | A | | 10/1999 | Yoshino et al. ............. 428/328 |
| 5,965,252 | A | | 10/1999 | Santo et al. ................. 428/329 |
| 6,342,289 | B1 | | 1/2002 | Eguchi et al. .............. 428/195 |
| 6,513,922 | B2 | * | 2/2003 | Katsuragi et al. ........... 347/100 |
| 6,521,323 | B1 | | 2/2003 | Sakaki et al. ............... 428/195 |
| 6,558,740 | B1 | | 5/2003 | Santo et al. ................. 427/146 |
| 6,649,661 | B2 | | 11/2003 | Yoshino et al. ............... 516/93 |
| 2001/0055055 | A1 | | 12/2001 | Eguchi et al. .............. 347/105 |
| 2002/0012629 | A1 | | 1/2002 | Yoshino et al. ............. 423/625 |
| 2002/0029722 | A1 | * | 3/2002 | Shioya et al. ............ 106/31.43 |
| 2002/0191062 | A1 | * | 12/2002 | Bruinsma et al. ........... 347/100 |
| 2004/0048008 | A1 | | 3/2004 | Yoshino et al. ............ 428/32.1 |

FOREIGN PATENT DOCUMENTS

| EP | 0 585 616 A1 | 3/1994 |
|---|---|---|
| EP | 1 080 938 A2 | 3/2001 |
| EP | 1 142 968 A1 | 10/2001 |
| JP | 57-44605 A | 3/1982 |
| JP | 3-48953 B2 | 7/1991 |
| JP | 4-65802 B2 | 10/1992 |
| JP | 7-232474 A | 9/1995 |
| JP | 8-132731 A | 5/1996 |
| JP | 9-66664 A | 3/1997 |
| JP | 9-76628 A | 3/1997 |
| JP | 2704894 B2 | 10/1997 |
| JP | 11-198399 A | 7/1999 |
| JP | 2001-138628 A | 5/2001 |

* cited by examiner

*Primary Examiner*—J. A. Lorengo
*Assistant Examiner*—Veronica Faison-Gee
(74) *Attorney, Agent, or Firm*—Fitzpatrick, Cella, Harper & Scinto

(57) ABSTRACT

A water-based ink that comprises a water-soluble anionic colorant, an aluminum ion and an acid ion, wherein the content of the acid ion is more than that of the aluminum ion, and the content of the water-soluble anionic colorant is 20 to 1,000 times as much as that of the acid ion by molar ratio.

11 Claims, 1 Drawing Sheet

FIGURE
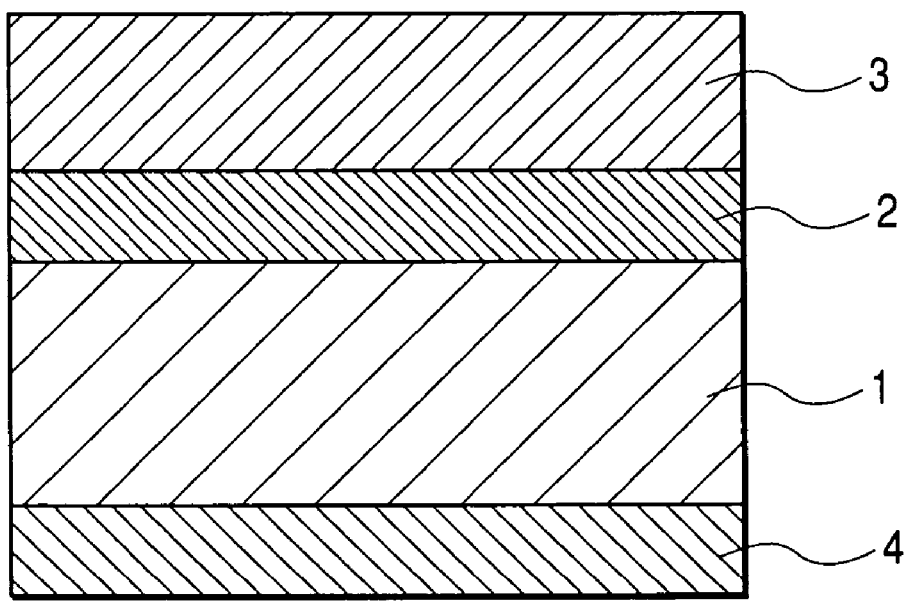

WATER-BASED INK AND INK RECORDING METHOD

This application claims priority from Japanese Patent Application No. 2003-185201 filed on Jun. 27, 2003, which is hereby incorporated by reference.

BACKGROUND OF THE INVENTION

1. Field of the Invention

The present invention relates to a recording water-based ink to be used in printers, recording equipment or writing utensils for industrial, office or home use, as well as to a recording method using the ink. More particularly, the present invention relates to an ink and a recording method with the ink suitable for a recording medium having a water-based ink receiving layer provided on a substrate (base paper) suitable for ink jet recording. More specifically, it relates to a water-based ink having sufficient properties as an ink and properties contributing to improvement of the recorded image and a recording method utilizing the same.

2. Related Background Art

In the recording media for ink (hereinafter simply called recording media) having satisfactory ink absorbing properties and capable of providing a high quality image, there is recently a commercialized recording medium employing an alumina hydrate as an inorganic pigment for the ink-receiving layer. Such a recording medium having the ink-receiving layer of alumina hydrate shows satisfactory fixation of the dye contained in the ink as a colorant because of the positive charge of alumina hydrate. In addition, because of the high transparency of alumina hydrate, it has characteristics superior to the conventional recording media in providing an image of high print density and good color development, and of high surface gloss, allowing formation of photographic images. hydrate as an inorganic pigment for the ink-receiving layer. Such a recording medium having the ink-receiving layer of alumina hydrate shows satisfactory fixation of the dye contained in the ink as a colorant because of the positive charge of alumina hydrate. In addition, because of high transparency of alumina hydrate, it has characteristics superior to the conventional recording media in providing an image of high print density and good color development, high surface gloss allowing formation of photographic images.

Recently, digital cameras have become very popular, and the recording medium for printing image information of digital cameras is required to have not only a high image quality but also photographic gloss in order to form images similar to a silver halide photograph. When the ink-receiving layer utilizing alumina hydrate is formed on a film by applying a coating liquid containing alumina hydrate, an image with photograph-like gloss is obtained, but when the substrate is a fibrous substrate such as paper, photograph-like gloss cannot be obtained by merely using an alumina hydrate coating liquid for the ink-receiving layer. In such a case, therefore, a process such as a supercalendering process or a casting process is used for providing a glossy ink-receiving layer. The casting process, especially, can provide an image having gloss similar to the silver halide photograph.

The aforementioned ink-receiving layer containing alumina hydrate shows an excellent colorant-fixing ability because alumina functions as a cationic reactant to an anionic dye. In order to obtain a recording medium of photographic gloss, it is already known to form an ink-receiving layer with alumina hydrate and polyvinyl alcohol (a binder) by the casting process. For a glossy ink jet recording medium, especially, there is proposed an improvement in the cast coating method including re-swelling of the receiving layer (for example, see Japanese Unexamined Patent Publication No. 2001-138628).

Now, the image quality obtained by an ink jet recording on such a recording medium has become very fine, comparable to that of a silver halide photograph, which is regarded as a representative of high image quality. Thus the ink used for such a high quality image recording requires more strict quality control.

One problem is the presence of impurities in the ink derived from impurities remaining in raw materials of the ink such as a colorant, or derived from the impurities in the constituent materials of the recording apparatus, especially the ink container, such as polypropylene (PP) or polyethylene terephthalate (PET). Such impurities contaminating the ink cause clogging in the recording ink feed path or deterioration in the feed characteristics, and are problematic, particularly in high image quality recording.

Impurities in the ink, either resulting from contaminants of a colorant not removed during the preparation process, or eluted from the ink tank or ink supply system, have been recognized as a problem. In many cases, such impurities cannot be removed, or even if they could be removed, further purification costs would become an obstacle in view of supplying an inexpensive product to the users.

In consideration of such situation, there is proposed a method of maintaining the total content of calcium, magnesium, manganese, iron, aluminum and silicon contained in the ink at 20 ppm or less thereby improving the nozzle clogging or resolving a kogation problem in a thermal ink jet recording utilizing heat as an ink discharge energy (cf. Japanese Patent Publication No. 3-48953).

Also a technology for enabling stable image formation against ink contamination with impurities eluting from the constituent materials of the recording unit such as the ink tank is disclosed, defining the relationship between the amount of silicon eluted from the ink absorbent member of the ink tank and the stable ink jet recording properties (cf. Japanese Unexamined Patent Publication No. 11-198399).

As explained above, the problem of impurities contaminating the ink, for example, those derived from the colorant impurities or those eluting from the constituent materials of the ink tank or the ink supply system, and countermeasures therefor have been studied, but not with satisfactory results. Presumably, it is because these countermeasures are limited to confining the impurity content to a certain level or less in the ink.

The above problem is especially conspicuous with an ink jet recording apparatus which ejects small ink droplets whose amount is 5 picoliter or less.

SUMMARY OF THE INVENTION

In consideration of the foregoing, the present invention focuses on aluminum ion in the ink derived from the colorant impurity not removed during the preparation process, or derived from the ink container made of PP or PET in contact with the ink, and provides a water-based ink which not only avoids drawbacks caused by the aluminum ion, such as ink discharge failure at the image recording, but also utilizes the presence of the aluminum ion for improving the quality of the recorded image. The present invention also provides an ink recording method utilizing such a water-based ink.

The water-based ink of the present invention comprises a water-soluble anionic colorant, an aluminum ion and an acid ion, wherein the content of the acid ion is more than the content of the aluminum ion and the content of the water-soluble anionic colorant is 20 to 1,000 times as much as that of the acid ion by molar ratio.

The present invention also provides an ink recording method utilizing the aforementioned water-based ink.

BRIEF DESCRIPTION OF THE DRAWINGS

FIG. 1 is a schematic cross-sectional view of a recording medium having an ink-receiving layer.

DESCRIPTION OF THE PREFERRED EMBODIMENTS

In the following, the present invention is described in more detail with preferred embodiments thereof.

The present inventors carried out intensive investigations to resolve the aforementioned drawbacks in the conventional ink caused by a trace amount of aluminum ion contained as an impurity in the ink, at the same time, to utilize the presence of the aluminum ion for improving the recorded image quality. As a result, they have found an ink composition having satisfactory ink properties (behavior), especially with a recording medium having an ink-receiving layer containing alumina hydrate. Thus the present invention was made.

The water-based ink of the present invention is preferably employed in recording on a recording medium provided with an ink-receiving layer containing a water-soluble binder and alumina hydrate for retaining a colorant. First, such a recording medium is explained.

(Recording Medium)

A recording medium usable in the present invention may be any medium having one layer or more on a substrate, of which outermost layer is an ink-receiving layer containing at least alumina hydrate. FIG. 1 is a schematic cross-sectional view of a recording medium employable in the present invention. The recording medium shown in FIG. 1 is constituted by forming, on a substrate formed by a base paper 1 with an undercoat layer 2, an ink-receiving layer 3 containing alumina hydrate, and a rear surface layer 4 on a side of the substrate opposite to the ink-receiving layer 3.

(Substrate)

A preferable substrate constituting the recording medium employable in the present invention is one that allows evaporation of water or solvent components from the rear surface of the substrate during the drying step of the ink-receiving layer in the casting process for forming gloss surface on the recording medium, such as a fibrous substrate, namely paper. Such paper can be a base paper made from pulp and one or more additives by using a paper machine. The pulp may be a wood pulp including chemical pulp such as LBKP or NBKP, mechanical pulp such as GP, PGW, RMP, TMP, CTMP, CMP and CGP, and recycled pulp such as DIP; or a non-wood pulp such as kenaf, bagasse or cotton; and the additives include a binder or size agent, a filler containing a known pigment as a main component, a fixing agent, a yield-improving agent, a cationization agent, a paper-strengthening agent etc., the machine includes a Fourdrinier paper machine, a cylinder paper machine, a twin-wire paper machine etc. It is also possible to employ a base paper subjected to sizing with starch, polyvinyl alcohol etc. or to anchoring treatment, or a coated paper such as an art paper, a coated paper, or a cast coated paper having a coated layer provided on such a base paper.

Further, in view of evaporation of water or solvent from the rear surface of the substrate and coating property in the formation of an undercoat layer for providing the ink-receiving layer, it is preferable to employ a substrate paper having an air permeability of 20 to 500 seconds according to JIS P8117. If the air permeability is less than the aforementioned range, the substrate is not sufficiently dense so that the substrate absorbing ink swells and causes cockling, unable to provide a texture comparable to a silver halide photograph. On the other hand, if the air resistance is larger than the aforementioned range, evaporation of water or solvent from the rear surface of the substrate in the casting process becomes difficult, thereby a satisfactorily glossy surface cannot be obtained.

In order to prevent a reduction of the gloss obtained by the casting process, it is preferable, in the present invention, to employ a substrate having a Stockigt sizing degree (JIS P8122) within a range of 20 to 300 seconds and a Beck's smoothness (JIS P8119) within a range of 10 to 60 seconds. Also in order to obtain a recording medium having a texture and high grade impression comparable to a silver halide photograph with a sufficient stiffness even when it is A4 or larger, it is preferred to employ a substrate with a basis weight of 140 to 200 g/m$^2$, and a Gurley stiffness (JIS P8125, machine direction) of 3 to 15 mN. In the preparation of the recording medium of the present invention, it is preferred to employ a substrate of which a basis weight, a thickness, an ash content, an internal sizing amount, and a surface sizing amount are suitably selected and adjusted so that the properties of the substrate remain in the aforementioned ranges.

(Undercoat Layer)

Next, materials for forming an undercoat layer in the preparation of the recording medium usable in the present invention are described. Such undercoat layer can be formed with a coating liquid containing a pigment and a binder, and preferably has an ink receiving property.

The pigment can be one or more selected from the following: for example, inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, alumina, alumina hydrate, aluminum hydroxide, lithopone, zeolite and hydrated halocite, and organic pigments such as a styrene plastic pigment, an acrylic plastic pigment, polyethylene particles, microcapsule particles, urea resin particles and melamine resin particles.

The binder is not particularly limited and can be any material as long as it can form a film binding the aforementioned pigment and does not hinder the effects of the present invention. Examples include a starch derivative such as oxidized starch, etherified starch or phosphorylated starch; a cellulose derivative such as carboxymethyl cellulose or hydroxyethyl cellulose; casein, gelatin, soybean protein, polyvinyl alcohol or a derivative thereof; a conjugate polymer latex such as polyvinylpyrrolidone, maleic anhydride resin, styrene-butadiene copolymer or methyl methacrylate-butadiene copolymer; an acrylic polymer latex such as a polymer or a copolymer of an acrylate ester or a methacrylate ester; a vinyl polymer latex such as ethylene-vinyl acetate copolymer; a modified polymer latex of the aforementioned polymers of which functional groups such as carboxyl group are modified; the aforementioned polymers cationized with a cationic group, a polymer of which surface is cationized with a cationic surfactant, a polymer formed by polymerization in the presence of cationic polyvinyl alcohol to have polyvinyl alcohol on the surface of the polymer, or a polymer prepared by polymerization in a suspension of cationic colloid particles to bear the particles on the surface of the polymer; an aqueous binder, for example, a thermosetting synthetic resin such as melamine resin or urea resin; a polymer or copolymer resin, for example, an acrylate ester or a methacrylate ester such as polymethyl-methacrylate; and a synthetic resin binder such as polyurethane resin, unsaturated polyester resin, vinyl chloride-vinyl acetate copolymer, polyvinyl butyral, or alkyd resin. Such binders can be employed singly or in combination.

The undercoat layer can be easily obtained by applying a coating liquid containing a pigment and a binder on the substrate and drying it. In such operation, the undercoat layer is formed at least on the surface where the ink-receiving layer is provided, but may also be formed on the rear surface, that is, on both sides of the substrate. In consideration of stability of the recording medium, the undercoat layer is preferably formed on both the top and rear surfaces of the substrate. The dry-coating amount of the undercoat layer is preferably 10 g/m² or higher, more preferably 15 g/m² or higher, in order to sufficiently cover surface fibers such as the cellulose pulp constituting the substrate. If the dry-coating amount is less than 10 g/m², the surface fibers cannot be completely covered, so that the surface gloss is affected.

Also the amount of the binder in the coating liquid for the undercoat layer is preferably maintained at 5 to 50 mass % of the pigment. An amount of the binder less than the aforementioned range tends to generate cracks in the undercoat layer and results in an insufficient mechanical strength of the undercoat layer and falling off of powder. Also an amount exceeding the aforementioned range tends to result in deterioration of the absorbing property for the ink solvent, and a decrease in evaporation of water etc. (decreased movement of vapor to the rear surface of the substrate) in the casting process. In the present invention, a calendering process may be done, if necessary, after the formation of the undercoat layer to control the thickness of the substrate/undercoat layer.

In the recording medium to be employed in the present invention, in consideration of evaporation of water and solvent components from the rear surface of the substrate or coating property for the ink-receiving layer formed later as the outermost layer, the substrate preferably has an air permeability (JIS P8117) of 1,500 to 5,000 seconds after the formation of the undercoat layer. It also preferably has a Stockigt sizing degree of 100-400 seconds and a Beck's smoothness of 100-500 seconds. These characteristics can be attained by suitably controlling the composition and dry-coating amount of the undercoat layer with or without the calendering process. Also in order to obtain a recording medium of a excellent texture and a high grade feeling comparable to a silver halide photograph having a sufficient stiffness even when it is in A4 size or larger, it is preferable for the substrate with the undercoat layer to have a basis weight of 160 to 230 g/m², and a Gurley stiffness (JIS P8125, machine direction) of 7 to 15 mN.

(Ink-receiving Layer)

The recording medium employable in the present invention has an ink-receiving layer containing an alumina hydrate and a water-soluble binder. Such an ink-receiving layer is formed, as illustrated in FIG. 1, on the undercoat layer prepared as described above. The process of ink-receiving layer preparation is described below.

It is preferable to form the ink-receiving layer after the two-step surface treatment of the undercoat layer prepared as above. The first surface treatment step is application of a first coating liquid containing at least one compound selected from boric acid and borate salts to the undercoat layer followed by drying thereof. The second surface treatment step is application of a second coating liquid containing at least a compound selected from boric acid and borate salts to the undercoat layer after the first surface treatment step. It is preferable to form the ink-receiving layer while the second coating liquid applied in the second surface treatment step is still wet. The second coating liquid is, in view of the crack suppressing ability, a liquid containing borax (sodium tetraborate).

For preparing the recording medium usable in the present invention, it is preferable to form an ink-receiving layer as an outermost layer after the undercoat layer is subjected to the aforementioned surface treatment of two kinds. In the following, the ink-receiving layer for the recording medium employable in the present invention is described. In general, the ink-receiving layer can be formed by applying a coating liquid containing the following inorganic or organic pigment and a binder.

Examples of the inorganic pigment include light calcium carbonate, heavy calcium carbonate, kaolin, aluminum silicate, diatomaceous earth, calcium silicate, magnesium silicate, synthetic amorphous silica, colloidal silica, alumina, alumina hydrate, or magnesium hydroxide, and examples of the organic pigment include a styrene plastic pigment, an acrylic plastic pigment, polyethylene particles, microcapsule particles, urea resin particles and melamine resin particles.

The present inventors carried out, from various standpoints, fundamental technical analyses of the pigment, the binder and the solvent for dissolving the binder to be contained in the coating liquid. As a result, they have found out that, among the aforementioned materials, use of alumina hydrate as a main component of the ink-receiving layer is especially preferable, in view of dye fixing property, transparency, print density, color developing property and gloss. Further, the content of alumina hydrate in the coating liquid for forming the ink-receiving layer is preferably 60 to 100 mass % of the pigment contained in the coating liquid.

The alumina hydrate is preferably one represented by the following general formula (1):

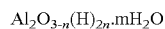

wherein n represents 0, 1, 2 or 3; and m is a figure in the range of 0-10, preferably 0-5, with the proviso that m and n are not 0 at the same time. Since mH₂O represents free water not involved in the formation of the crystal lattice, m may be an integer or not. Also m may become 0 when heated.

An alumina hydrate can be produced in general by a known method such as hydrolysis of an aluminum alkoxide or hydrolysis of sodium aluminate as described in U.S. Pat. Nos. 4,242,271 and 4,202,870, or a method of neutralization by adding an aqueous solution of aluminum sulfate or aluminum chloride to an aqueous solution of sodium aluminate or the like, as described in Japanese Patent Publication No. S57-44605.

The alumina hydrate preferable for forming the ink-receiving layer constituting the recording medium employable in the present invention is an alumina hydrate having a boehmite or amorphous structure confirmed by X-ray diffraction analysis, particularly alumina hydrate described in Japanese Unexamined Patent Publication Nos. 7-232474, 8-132731, 9-66664 and 9-76628.

The ink-receiving layer of the recording medium employable in the present invention is formed with a coating liquid which contains the above-described alumina hydrate as a main component and a water-soluble binder described later. The water-soluble binder to be used in the coating liquid for forming the ink-receiving layer is preferably polyvinyl alcohol. The content of polyvinyl alcohol in the coating liquid is preferably within a range of 5 to 20 mass % of the alumina hydrate. Also as the water-soluble binder to be used in the formation of the ink-receiving layer, a known water-soluble binder may be employed in combination with polyvinyl alcohol.

Further, in order to attain high ink absorbing property and a high ink fixing property, the ink-receiving layer made of the aforementioned materials preferably has the following pore properties.

The ink-receiving layer preferably has a fine pore volume within a range of 0.1 to 1.0 $cm^3/g$. If the pore volume is less than the aforementioned range, the ink-receiving layer has an inferior ink absorbing property, which may cause overflow of the ink and blotting in the image. On the other hand, if the pore volume exceeds the aforementioned range, crack formation or falling off of powder may occur in the ink-receiving layer.

Also the ink-receiving layer preferably has a BET specific surface area of 20-450 $m^2/g$. A value less than this range may be unable to provide a sufficient gloss, and may provide a foggy image because of increased haze (i.e. decrease in transparency). Also it is undesirable because the dye adsorbing property may be deteriorated. Also a value exceeding this range is undesirable, as the ink-receiving layer tends to crack. The pore volume and the BET specific surface area can be determined by the nitrogen adsorption-desorption method.

Recent progress in formation of the ink-receiving layer allows larger latitude in the thickness of the ink-receiving layer. Thus it is possible to form an ink-receiving layer thicker than before.

In the present invention, in view of high ink absorbing property, the dry-coating amount of the ink-receiving layer is preferably within the range of 30 to 50 $g/m^2$. The dry-coating amount less than the aforementioned range is undesirable, particularly when many inks including light inks in addition to black, cyan, magenta and yellow ink are applied to the recording medium, because insufficient ink absorbing property leads to overflow of the ink resulting in a bleeding phenomenon or a decrease in the print density as the ink dye diffuses to the substrate. On the other hand, the dry-coating amount exceeding the aforementioned range may fail in suppressing crack formation in the ink-receiving layer. A dry-coating amount of the ink-receiving layer not less than 30 $g/m^2$ is preferable as it can provide an ink-receiving layer showing sufficient ink absorption properties even in an environment of high temperature and high humidity. Also a dry coating amount not higher than 50 $g/m^2$ allows uniform coating whereby the ink-receiving layer with a stable thickness is formed.

In forming the ink-receiving layer explained above, the coating liquid is preferably applied by an on-machine or off-machine process, suitably selecting a coating apparatus such as a blade coater, a roll coater, an air-knife coater, a bar coater, a rod blade coater, a curtain coater, a gravure coater, an extrusion coater, a slide hopper coater, or a size press so as to obtain an appropriate coating amount mentioned above. It is also possible, at the coating operation, to heat the coating liquid or coater head to adjust the viscosity of the coating liquid.

Drying after the coating can be carried out by using a suitably selected drying apparatus, for example, a hot air dryer such as a straight tunnel dryer, an arch dryer, an air loop dryer, or a sinusoidal curve air-float dryer, an infrared dryer or a microwave dryer.

(Formation of Glossy Surface)

The recording medium usable in the present invention is preferably subjected, after the formation of the ink-receiving layer as explained above, to the formation of a glossy surface on the surface of the ink-receiving layer by a casting process. The casting process is to press the ink-receiving layer in a swelled or plastic state to a heated mirror-surfaced drum (casting drum) and to dry the layer in the pressed state, thereby copying such a mirror surface to the surface of the ink-receiving layer. There are three representative methods, a direct method, a rewetting (indirect) method, and a coagulation method.

All these casting methods are usable, but, since the ink-receiving layer of the recording medium employable in the present invention contains alumina hydrate, it is preferred to form a glossy surface by the rewet casting method. That is, processing with the rewet casting method enables formation of a highly glossy surface on the recording medium.

(Formation of Rear Surface Layer)

The recording medium employable in the present invention may have a rear surface layer on the rear side of the substrate (a side opposite to the side bearing the ink-receiving layer). Formation of such a rear surface layer is effective for reducing curling before or after the printing. In consideration of an effect for suppressing curling, the rear surface layer preferably shrinks to the same extent, with moisture absorption, as the undercoat layer and/or the ink-receiving layer on the front side of the substrate. Therefore, the rear surface layer is preferably formed with a pigment and a binder similar to those used in these layers. It is particularly preferable to employ a pigment and a binder similar to those employed for forming the ink-receiving layer which has a larger thickness.

(Ink)

The water-based ink (hereinafter simply called ink) of the present invention contains a water-soluble anionic colorant, an aluminum ion and an acid ion, wherein the content of the acid ion is more than the content of the aluminum ion and the content of the water-soluble anionic colorant is 20 to 1,000 times as much as that of the acid ion by molar ratio. The ink of the present invention is supposed to contain a trace amount of aluminum ions, originating from a substance remaining in the raw materials employed for producing the colorant or from a substance eluted from the materials constituting the ink tank etc. at the use of the ink. In the following, materials constituting the ink of the present invention will be explained.

(Water-soluble Anionic Colorant)

As the colorant, known water-soluble dyes described in the color index or newly synthesized water-soluble dyes can be employed without any particular restriction.

(Aluminum Ions)

As described above, the water-based ink of the present invention contains a trace amount of aluminum ions. The aluminum ion is present in the ink by the following two reasons:

(1) In the preparation of an ink suitable for ink jet recording or the like, usually the amount of inorganic ions in the ink is strictly controlled by employing purified water and purified raw materials. It is, however, not easy to reduce the impurity content to zero even after repeating purification of the raw materials, and such repeated purification may result in cost increase. Therefore, aluminum or compounds thereof may still remain in the raw materials of the colorant etc., and an ink prepared from such materials may contain a small amount of aluminum ion.

(2) Even when the amount of the aluminum ion contaminating the ink is strictly controlled, aluminum may still be dissolved from the components constituting the ink jet recording apparatus, particularly from the ink container, whereby the aluminum ion is mixed into the ink and remains therein. For example, as described in Japanese Patent No. 2704894, an aluminum compound such as hydrotalcite may be employed as a neutralizing agent for polyolefin plastics, and the present inventors found out that such a compound may become an elution source to cause an increase of the aluminum ion in the ink.

Further, according to the investigation of the present inventors, the effect of the present invention is most adequately exhibited when the aluminum ion contained as an impurity in the ink at a content of 1 ppm or less, 10 ppm or less at a maximum. More specifically, the ink of the present invention not only effectively suppresses the disadvantages caused by the contamination of the ink with a trace amount of the aluminum ion of 10 ppm or less originating from the ink raw materials or from the constituting materials of the recording apparatus, but also endow additional properties to the formed image. In the present invention, ppm means the mass of aluminum ion (mg/kg) present in 1 kg of ink.

In the present invention, as explained above, the ink contained in an ink container contains the aluminum ions, but the ink, before being loaded into an ink container does not necessarily contain aluminum ions. Thus, an ink having the configuration of the present invention except for the aluminum ion can provide the remarkable effects of the present invention if it is loaded into such an ink container from which the aluminum ion elutes.

(Acid Ion)

The water-based ink of the present invention further contains an acid ion and is characterized in that the water-soluble anionic colorant, the aluminum ion and acid ion in the ink have such a relationship that the content of the acid ion is more than the content of the aluminum ion and the content of the water-soluble colorant is 20 to 1,000 times as much as the content of the acid ion by molar ratio.

The acid ion employed in the present invention preferably has a function of capturing the aluminum ion present as an impurity etc. in the ink, forming a complex therewith. Presence of the acid ion having such a function in the ink allows suppression of the drawback such as ink ejection failure in ink jet recording due to a trace amount of the aluminum ion contained in the ink.

According to the investigation of the present inventors, once an acid ion-aluminum ion complex is formed it can be stably dissolved in the ink. Preferable acids include oxycarboxylic acid such as citric acid, polyaminocarboxylic acid such as EDTA, condensed phosphate salts, in which citric acid is especially preferable. A particularly preferable result can be obtained when the acid ion is a citrate ion derived from trisodium citrate. The inventors deduce that the reason of such excellent effects are obtained with the citrate ion in the ink are as follows.

Firstly, citrate compounds are used as an excellent masking agent for metal ions. Also aluminum citrate is water-soluble and is stable in a wide pH range. It is also stable against evaporation of the solvent component in the ink or a pH change therein, thereby solubilizing the aluminum ion in stable manner.

As described above, the ink of the present invention is characterized in that it is for use on a recording medium having an ink-receiving layer containing an alumina hydrate for holding the colorant and a water-soluble binder. According to the investigation of the present inventors, it is found out that, with such a recording medium, the acid ion-aluminum ion complex exhibits a characteristic behavior to provide the recorded image with an additional function as explained below.

More specifically, the additional function is an increase in image density (optical density: OD) of the recorded image. Such effect is presumably based on a fact that, in a process of adsorption of the colorant in the ink-receiving layer of the recording medium where solid-liquid separation of the ink occurs, the acid ion and the aluminum ion dissolved as a complex in the ink act on the alumina hydrate-binder and the water-soluble anionic colorant such as the water-soluble dye in the ink, assisting coagulation of the colorant and accelerating the fixation of the colorant to the ink-receiving layer. From this viewpoint, the aluminum ion concentration is preferably 0.1 ppm or more.

In the present invention, the expression "aluminum ion and acid ion" is used, regardless whether or not the aluminum ion and the acid ion form a complex in the ink.

In the present invention, a relative relationship of the contents of the water-soluble anionic colorant, the aluminum ion and the acid ion constituting the ink is important and will be explained in detail in the following. In the ink of the present invention, it is required that the content of the acid ion is more than the content of aluminum ion and the content of the water-soluble anionic colorant is 20 to 1,000 times as much as the content of the acid ion by molar ratio.

In the present invention, the content of the acid ion is preferably 3-100 times (both inclusive), more preferably 3-50 times (both inclusive), as much as the content of the aluminum ion by molar ratio.

As to the specific contents, when the aluminum ion is contained in small amount (more than 1 ppm but not higher than 10 ppm), it is preferable that the content of the water-soluble anionic colorant is 2.0 to 10 mass % of the entire mass of the ink and that the content of the acid ion is 5 to 1,000 ppm. When the content of the aluminum ion is not less than 0.1 ppm and not more than 1 ppm, it is preferable that the content of the water-soluble anionic colorant is 0.5 to 10 mass % of the entire mass of the ink and that the content of the acid ion is 5 to 500 ppm.

The aluminum ion in the ink can be quantitatively analyzed by an ordinary method such as plasma emission spectroscopy or ion chromatography, and the water-soluble anionic colorant and the acid ion can be quantitatively analyzed by an ordinary method such as liquid chromatography or ion chromatography. The molar contents of the water-soluble anionic colorant and acid ion can be calculated from respective molecular weights determined by mass spectrometry.

The reason why the relationship of three components in the ink has to be regulated such that the content of the acid ion is more than the content of the aluminum ion and that the content of the water-soluble anionic colorant in the ink is 20 to 1,000 times as much as the content of the acid ion in molar ratio in the ink is as follows: firstly, enough capture of the aluminum ion is not possible unless the acid ion is present in the ink in a sufficient amount with respect to the aluminum ions, and it is necessary that the water-soluble anionic colorant is contained in an amount larger than that of the acid ion (also the aluminum ion), because as the acid ion-aluminum complex increases, the water-soluble anionic colorant being another anionic compound in the ink serves to maintain the ink stability.

(Other Ink Components)

Components constituting the ink of the present invention include an aqueous medium such as water or a mixed solvent of water and an organic solvent as an essential component, and may also include various additives according to the necessity. Such components can be suitably selected from already known ones.

Further to the advantages of the present invention, Japanese Unexamined Patent Publication No.H4-65802 discloses an effect of aluminum citrate as an insect repellent. Thus a print obtained with the ink of the present invention may be expected to have a further additional function.

(Recording Method and Recording Apparatus)

The recording medium described above is suitable for an ink-jet recording method for forming an image by attaching ink droplets onto a recording medium, and is particularly preferably employed as a recording medium for the bubble jet recording system (registered trade mark).

As to the representative configuration and principle of the usable ink jet recording system, for example, the one based on the basic principle disclosed in U.S. Pat. Nos. 4,723,129 and 4,740,796 is preferable. This system is applicable to either the so-called on-demand type or the continuous type.

Particularly the on-demand type is effective because, by applying at least one driving signal which gives rapid temperature elevation exceeding nucleus boiling corresponding to the recording information on an electrothermal converting member arranged corresponding to the sheets or liquid channels holding liquid (ink), thermal energy is generated at the electrothermal conversion member to induce film boiling at the heat action surface of the printing head, and a bubble is consequently formed in the liquid (ink) corresponding one-to-one to the driving signals. By ejecting the liquid (ink) through an ejection opening by the growth and shrinkage of the bubble, at least a droplet is formed. By forming the driving signals into pulse shapes, growth and shrinkage of the bubble can be effected instantly and adequately to accomplish more preferable discharging of the liquid (ink) particularly excellent in the response characteristics. As the driving signals of such pulse shapes, those disclosed in the U.S. Pat. Nos. 4,463,359 and 4,345,262 are suitable. Further excellent recording can be performed by employment of the conditions described in the U.S. Pat. No. 4,313,124 of the invention concerning the temperature elevation rate of the above-mentioned heat action surface.

EXAMPLES

In the following, the present invention will be described further with Examples and Comparative Examples, but the present invention is not limited thereto. In the following, "parts" and "%" are based on mass unless specified otherwise.

<<Preparation of Recording Medium>>

<Preparation of Substrate>

To a pulp slurry containing 67 parts of leaf bleached craft pulp (LBKP) of a CSF (Canadian Standard Freeness) of 450 ml and 8 parts of needle bleached kraft pulp (NBKP) of CSF 480 ml, 0.5 parts ofa paper reinforcing agent (RB-151, manufactured by Harima Kasei Co.) and 2 parts of aluminum sulfate were added, and the pH was adjusted to 7.8. A substrate was prepared using tlitts-prepared the thus-prepared pulp slurry.

(Preparation of Coating Liquid for Undercoat Layer)

An undercoat layer was formed with a coating liquid prepared in the following manner. A coating liquid of 60% solid content was prepared by adding 7 parts of commercially available styrene-butadiene latex to a slurry of 70% solid content containing 100 parts of a filler of kaolin (Ultra White 90, manufactured by Engelhard Ltd.)/zinc oxide/ aluminum hydroxide (mass ratio: 65/10/25) and 0.1 parts of a commercially available polyacrylic acid dispersant.

(Coating of Coating Liquid for Undercoat Layer)

On both surfaces of the substrate prepared in the foregoing, the coating liquid prepared above was applied and dried with a blade coater to a dry coating amount of 15 g/m$^2$. Then it was finished with a machine calender (linear pressure 150 kgf/cm) to obtain an undercoated substrate, having a basis weight of 185 g/m$^2$, a Stockigt sizing degree of 300 seconds, an air permeability of 3,000 seconds and a Beck's smoothness of 180 seconds.

(Preparation of Coating Liquid for Ink-receiving Layer)

Then a coating liquid for an ink-receiving layer was prepared in the following manner and was used for forming an ink-receiving layer on the undercoat layer prepared as described above. The coating liquid was prepared as follows. Alumina hydrate A (DISPERALHP 13, manufactured by Sasol Co.) was dispersed to a solid content of 5% in purified water, then hydrochloric acid was added to adjust the pH to 4 and the mixture was agitated for a while. Thereafter, the dispersion was heated to 95° C. under agitation and maintained at this temperature for 4 hours. While this temperature was maintained, the dispersion was adjusted to pH 10 with sodium hydroxide, and then agitated for 10 hours. After the dispersion returned to room temperature, the pH was adjusted to 7- 8. Then it was desalted and deflocculated by adding acetic acid to obtain a colloidal sol.

The colloidal sol was dried to obtain alumina hydrate B. The alumina hydrate B thus obtained was determined to have a boehmite structure (pseudo-boehmite) in an X-ray diffraction. The alumina hydrate B had a BET specific surface area of 143 m$^2$/g and a pore volume of 0.8 cm$^3$/g. In an observation under an electron microscope, it had a flat plate shape with an average aspect ratio of 7.5 and a squareness ratio of 0.7.

Separately, polyvinyl alcohol PVA1 17 (manufactured by Kuraray Co.) was dissolved in purified water to obtain an aqueous solution of 9% solid content. Then the colloidal sol of the aforementioned alumina hydrate B was concentrated to prepare a 22.5% dispersion, to which a 3% aqueous solution of boric acid was added to contain boric acid solid at 0.50% of the alumina hydrate B solid. Then the thus-obtained dispersion of alumina hydrate containing boric acid and the aqueous solution of polyvinyl alcohol were mixed in a static mixer in such a manner that the ratio of the alumina hydrate solid to the polyvinyl alcohol solid becomes 100:8, thereby obtaining a coating liquid for an ink-receiving layer.

(Coating of Coating Liquid for Ink-receiving Layer)

The coating liquid for the ink-receiving layer, prepared as described above, was used immediately after the mixing of the dispersion of alumina hydrate containing boric acid and the aqueous solution of polyvinyl alcohol and was coated by a die coater on the undercoat layer with a speed of 30 m/min so as to obtain a dry coating amount of 35 g/m$^2$, and was then dried at 170° C. to obtain an ink-receiving layer. The BET specific surface area of the obtained ink-receiving layer was 143 m$^2$/g, and the fine pore volume was 0.8 cm$^3$/g.

Examples 1-5 and Comparative Examples 1-5

<Preparation of Ink>

Components of compositions shown in Tables 1 and 2 were dissolved under sufficient mixing, and were filtrated by a filter of a pore size of 0.2 μm (manufactured by Fuji Photo Film Co.) under a pressure to obtain inks of Examples 1-5 and Comparative Examples 1-5. After the ink preparation, sodium aluminate was added to each ink to an amount (converted to aluminum ion) as shown in Tables 1 and 2. The amount of aluminum ion was determined by induction-coupled plasma emission spectroscopy (ICP). The molecular weights of dyes and acid ion were determined by mass spectrometry.

<Evaluation>

Evaluation 1: Recording and Ink Ejecting Property

Each of the inks of Examples 1-5 and Comparative Examples 1-5 was mounted on a color ink jet printer (trade name: BJ F890, manufactured by Canon Inc., ejection volume: 4 pl) and subjected to a printing durability test by printing 2,000 sheets of an image of 2% print density for each color. The ink jet printer used for this evaluation was an ink jet recording apparatus provided with an on-demand multi recording head that ejects the ink by providing the ink with thermal energy corresponding to a recording signal. The printing test was conducted under each of three environments of 25° C. and 55% RH, 30° C. and 10% RH, and 30° C. and 80% RH. The obtained images were visually evaluated by the following criteria. The results are shown in Table 3.

Criteria

+: under any environments, satisfactory image was obtained through to the end of the printing durability test, and no problem was found in the ink ejecting property;

−: image was disturbed in the course of the test, depending on the testing environment, and the ink ejecting property showed a problem.

Evaluation 2: OD of Image

Each of the inks of Examples 1-5 and Comparative Examples 1-5 was used, as in the evaluation 1, to print solid patterns up to a 100% duty ratio with steps of 12.5% under 25° C. and 55% RH, and the print density (OD) of the image was measured by using SPECTROLINO (GRETAG). The obtained result was evaluated by the following criteria and is shown in Table 3.

+: A certain increase (about 0.05 OD) in the OD was observed in comparison with the corresponding Comparative Example.

−: A certain increase in the OD was not observed in comparison with the corresponding Comparative Example.

TABLE 1

Ink compositions of Examples (mass %)

| Ink composition | Example 1 | Example 2 | Example 3 | Example 4 | Example 5 |
|---|---|---|---|---|---|
| Glycerin | 8 | 8 | 8 | 8 | 8 |
| Ethylene glycol | 8 | 8 | 8 | 8 | 8 |
| Acetylenol EH (manufactured by Kawaken Fine Chemical) | 1 | 1 | 1 | 1 | 1 |
| Urea | 8 | 8 | 8 | 8 | 8 |
| Lithium hydroxide | 0.5 | 0.1 | 0.05 | 0.05 | 0.05 |
| Ammonium sulfate | 0.2 | 0.05 | 0.05 | 0.05 | 0.05 |
| C.I. food black 2 (black dye) | 4 | | | | |
| C.I. direct blue 199 (cyan dye) | | 4.5 | 4.5 | 6 | 4.5 |
| Citrate ions** (ppm) | 400 | 10 | 200 | 250 | 50 |
| Ion exchanged water | 70.26 | 70.349 | 70.38 | 68.875 | 70.395 |
| Aluminum ion analyzed after addition (ppm) | 1.0 | 0.3 | 2.0 | 0.4 | 0.8 |
| Acid ion/Al ion molar ratio | 57 | 5 | 14 | 89 | 9 |
| Dye/acid ion molar ratio | 23 | 990 | 50 | 53 | 198 |

*Sodium sulfonate = 2, sulfonamide = 1
**Citrate ion was added as trisodium citrate.

TABLE 2

Ink compositions of Comparative Examples (mass %)

| Ink composition | Comp. Example 1 | Comp. Example 2 | Comp. Example 3 | Comp. Example 4 | Comp. Example 5 |
|---|---|---|---|---|---|
| Glycerin | 8 | 8 | 8 | 8 | 8 |
| Ethylene glycol | 8 | 8 | 8 | 8 | 8 |
| Acetylenol EH (manufactured by Kawaken Fine Chemical) | 1 | 1 | 1 | 1 | 1 |
| Urea | 8 | 8 | 8 | 8 | 8 |
| Lithium hydroxide | 0.5 | 0.1 | 0.05 | 0.05 | 0.05 |
| Ammonium sulfate | 0.2 | 0.05 | 0.05 | 0.05 | 0.05 |
| C.I. food black 2 (black dye) | 4 | | | | |
| C.I. direct blue 199 (cyan dye) | | 4.5 | 4.5 | 4.5 | 0.3 |
| Citrate ions** (ppm) | | | | 4 | 50 |
| Ion exchanged water | 70.3 | 70.35 | 70.4 | 70.3996 | 74.595 |
| Aluminum ion analyzed after addition (ppm) | 1.0 | 0.3 | 2.0 | 0.3 | 1.0 |
| Acid ion/Al ion molar ratio | | | | 2 | 7 |
| Dye/acid ion molar ratio | | | | 2475 | 13 |

*Sodium sulfonate = 2, sulfonamide = 1
**Citrate ion was added as trisodium citrate.

TABLE 3

Evaluation results

| | Evaluation 1 | Evaluation 2 |
|---|---|---|
| Ex. 1 | + | + |
| Ex. 2 | + | + |
| Ex. 3 | + | + |
| Ex. 4 | + | + |
| Ex. 5 | + | + |
| Comp. Ex. 1 | − | |
| Comp. Ex. 2 | − | |
| Comp. Ex. 3 | − | |
| Comp. Ex. 4 | − | |
| Comp. Ex. 5 | − | |

Example 6

An ink of the composition of Example 2, without addition of aluminum ion after the ink preparation, was put in a container made of polypropylene/polyethylene that had been prepared using aluminum compound as the neutralizing agent, and stored at 60° C. The amount of the aluminum ion was 0.5 ppm when the ink was taken out after one month of storage. The ink of this Example 6 was subjected to a printing test and evaluated as in Examples 1-5 and Comparative Examples 1-5. As a result, no problem was found in the recording and in the ink discharge property, and a certain increase in the OD was also observed.

Comparative Example 6

An ink of the composition of Comparative Example 1, without addition of the aluminum ion after the ink preparation, was put in a container made of polypropylene/polyethylene that had been prepared utilizing an aluminum compound as the neutralizing agent, and stored at 60° C. The amount of the aluminum ion was 0.5 ppm when the ink, was taken out after one month of storage. The ink of this Comparative Example 6 was subjected to a printing test and evaluated as in Example 1. As a result, printing failure was observed.

As explained in the foregoing, the present invention provides a water-based ink capable of preventing drawbacks such as ejection failure in the image recording, caused by the aluminum ion remaining as an impurity in the colorant in the course of preparation thereof and aluminum ion originating from an ink container and dissolving into the ink by the contact thereof with an ink container formed with PP or PET. The ink of the present invention can utilize the presence of the aluminum ion for improving characteristics of the recorded image. An ink recording method utilizing such water-based ink is also provided.

What is claimed is:

1. A water-based ink comprising a water-soluble anionic colorant, an aluminum ion and an acid ion, wherein a content of the acid ion is more than a content of the aluminum ion and a content of the water-soluble anionic colorant is 20 to 1,000 times as much as the content of the acid ion by molar ratio.

2. The water-based ink according to claim 1, wherein the content of the acid ion is from 3 to 100 times as much as the content of the aluminum ion by molar ratio.

3. The water-based ink according to claim 1, wherein the content of the water-soluble anionic colorant is 2.0 to 10 mass %, the content of the acid ion is 5 to 1000 ppm, and the content of the aluminum ion is more than 1 ppm but not more than 10 ppm.

4. The water-based ink according to claim 1, wherein the content of the water-soluble anionic colorant is 0.5 to 10 mass %, the content of the acid ion is 5 to 500 ppm, and the content of the aluminum ion is not less than 0.1 ppm and not more than 1 ppm.

5. The water-based ink according to claim 1, wherein the acid ion is a citrate ion derived from trisodium citrate.

6. A water-based ink comprising a water-soluble anionic colorant, an aluminum ion and an acid ion for forming a complex with the aluminum ion, wherein a content of the acid ion is more than a content of the aluminum ion formed into the complex, and a content of the water-soluble anionic colorant is 20 to 1,000 times as much as the content of the acid ion by molar ratio.

7. An ink jet recording method for recording with a water-based ink on a recording medium having an ink-receiving layer, wherein the water-based ink is the ink according to claim 1.

8. The recording method according to claim 7, wherein the recording medium has an ink-receiving layer containing an alumina hydrate for holding a colorant and polyvinyl alcohol.

9. An ink recording method for recording with a water-based ink on a recording medium by an ink jet recording apparatus, wherein the water-based ink is the ink according to claim 1 and the ink jet recording apparatus ejects ink droplets whose amount is 5 picoliter or less.

10. The water-based ink according to claim 1, wherein the aluminum ion is derived from an ink container.

11. The water-based ink according to claim 1, wherein the ink is filled into an ink container from which aluminum ion elutes.

* * * * *

UNITED STATES PATENT AND TRADEMARK OFFICE
CERTIFICATE OF CORRECTION

PATENT NO. : 7,374,606 B2
APPLICATION NO. : 10/873156
DATED : May 20, 2008
INVENTOR(S) : Shinichi Sato et al.

It is certified that error appears in the above-identified patent and that said Letters Patent is hereby corrected as shown below:

COLUMN 1
Line 36, "hydrate as an inorganic pigment for the ink-receiv-" should be deleted.
Lines 37-45, "ing layer... photographic images." should be deleted.

COLUMN 3
Line 63, "etc.," should read --etc;--.

COLUMN 5
Line 57, "a excellent" should read --an excellent--.

COLUMN 9
Line 26, "contained" should read --is contained--.
Line 39, "container" should read --container,--.

COLUMN 10
Line 2, "of such" should read --such--.

COLUMN 12
Line 3, "craft" should read --kraft--.
Line 6, "ofa" should read --of a--.
Line 9, "tlitts-prepared" should be deleted.
Line 56, "PVA1 17" should read --PVA117--.

COLUMN 16
Line 31, "ink, was" should read --ink was--.

Signed and Sealed this

Ninth Day of December, 2008

JON W. DUDAS
*Director of the United States Patent and Trademark Office*